Jan. 1, 1963    G. HAYES    3,071,418
GUIDE TRACK MEANS
Filed Sept. 6, 1960    2 Sheets-Sheet 1
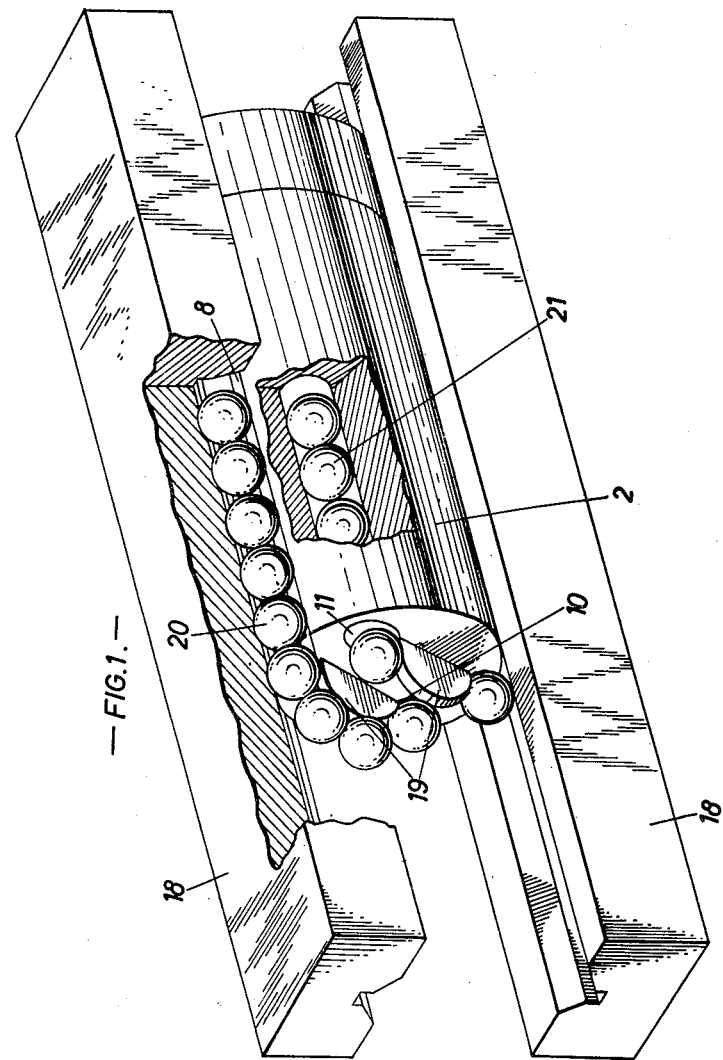

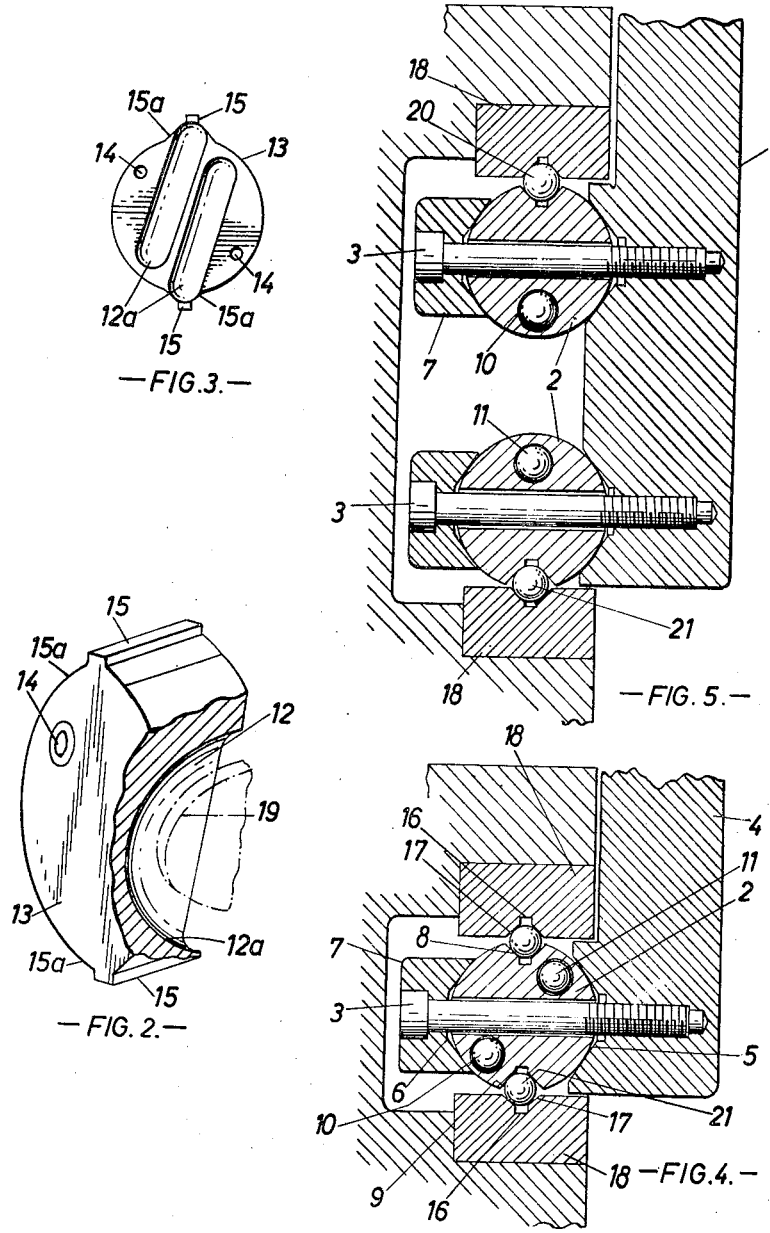

United States Patent Office 3,071,418
Patented Jan. 1, 1963

3,071,418
GUIDE TRACK MEANS
George Hayes, Leeds, England, assignor to Hayes Engineers (Leeds) Limited, Leeds, England, a British company
Filed Sept. 6, 1960, Ser. No. 54,067
Claims priority, application Great Britain Oct. 14, 1959
3 Claims. (Cl. 308—6)

This invention relates to methods of, and means for, guiding movable members in a given path.

In many instances members require to be guided accurately in straight lines, and a common method is to employ male and female faced V-guides or their equivalent. Such arrangements are invariably used in machine tools for worktables, saddles, tool knees or the like. It is well-known that not only accurate machining and grinding are required for the guide faces but frequent lubrication is needed and even then there is often substantial frictional resistance.

The main object of this invention is to provide an improved method of and means for mounting movable members so as to have a minimum frictional resistance.

Accordingly there is provided a method of mounting and guiding a movable member consisting in arranging at least one endless track of ball bearings to be capable of moving in a straight operative path interposed between bearing surfaces including a guide track in the periphery of carrier means, and arranging said ball bearings to move in an arcuate path out of and into the said straight path at both of its ends into and from a parallel free ball guide path in the carrier means.

The improved method may include arranging two endless tracks of ball bearings interposed between carrier means and opposed fixed spaced bearing surfaces with each track of balls working on opposite fixed surfaces. The method may also include confining each track of ball bearings in opposed parallel V-guide grooves in their operative path and in passageways in their free path.

The invention includes a guide unit for movable member, said unit including carrier means having at least one straight bearing guide track along its periphery, a free guide passageway within the carrier means and parallel with the track, guide means joining track and passageway at both ends by means of arcuate paths, and a set of ball bearings forming an endless track in said guide track, passageway and end guides. The carrier means may have two guide tracks diametrically opposite one another and two oppositely off-set guide passageways with end guide means joining each track to its passageway, and two sets of ball bearings to engage spaced opposed guide surfaces.

The invention will now be more particularly described with reference to the accompanying drawings, in which:

FIG. 1 is a perspective part-sectional view of an endless ball track guide unit, with one end cap removed, in association with a pair of superposed guide tracks;

FIG. 2 is a perspective part sectional view of one end cap for the guide unit;

FIG. 3 is a reduced end view of the cap from its inner face;

FIG. 4 is a cross-sectional elevation of the improved guide unit mounted in position; and FIG. 5 is a cross-sectional elevation of a pair of single ball track units mounted in co-operation.

In the illustrated embodiment of this invention the improved guide means comprise a guide unit which includes carrier means in the form of a body 2 of circular section to be affixed by transverse bolts 3 to a movable member 4 which requires to be guided. By allowing some clearance in the body for the bolts 3 and locating the body in a shallow V-groove 5 in the member with a V-groove 6 in the retaining bar (or collar) 7, the body will be self-aligning during mounting. Such body 2 is furnished with guide groove tracks 8, 9 in its periphery diametrically opposite one another and through the body are formed a pair of passageways 10, 11 each a required distance from and parallel with its particular peripheral guide groove. At each end of the body a semi-circular (or other shaped) guide path 12 is furnished for linking up each passageway 10, 11 with its peripheral guide groove 8, 9 and these end guide paths are in removable members 13. Conveniently the members 13 comprise end caps, each to be secured by a pair of screws through holes 14 and having opposite bar-like projections 15 rising from tapering shoulders 15a to enter with clearance the root clearance grooves 16 and the V-grooved guides 17 respectively, which grooves are provided in the guide tracks 18. Each end cap has a pair of semi-circular cavities 12a to receive semi-circular projections 19, of a lesser radius, which are formed on or secured to the adjacent end face of the body 2. The cavities and projections combine to form the guide paths 12, and the parts 15, 15a provide thickness in each end cap for the formation of the cavities.

Two sets of steel ball bearings 20, 21 are located to form endless ball tracks in the guide groove 8, 9 and 17, passageways 10, 11 and end guide paths 12. Moreover, the above formation of the end caps allows the ball bearings 20 on the top track to pass with clearance into the end paths 12 and lower track ball bearings 21 will pass out of their paths 12 with a slight rising movement into their lineal path.

Instead of a round-section body 2 it may be D-shaped or at least semi-circular on its mounting side which is secured to the member 4.

A unit of the above type is readily adapted to be located between the fixed guide tracks 18 which run parallel with one another a predetermined distance apart. When there is a guide unit on each side of a structure, on one side there can be a V-groove 17 in one fixed guide track 18 and a flat face on the other guide track. With this arrangement the ball bearings 20, 21 will form the bearing means between a movable member such as 4 and fixed guide surfaces to give easy movements of the movable member according to operative control of the member. It will be understood lubrication means may be furnished for each set of ball bearings and at least the guide track faces for the balls will be hardened.

It will be also understood that in some units only one set of ball bearings 20 or 21 may be required, such as where the unit is seated down on to a supporting fixed guide track 18, or where a pair of such units are spaced apart in co-operation as shown in FIG. 5 to engage oppositely-directed fixed guide tracks 18.

The aforesaid guide means are eminently suitable for use on machine tools for mounting some movable part and, whilst it is preferred to keep the units to a relatively short length and where required use two or more of such units in line, the units can be made of any required length within given limits so long as there can be free endless movement of the balls.

What I claim is:

1. Endless ball track bearing unit, comprising a body, at least one straight linear ball guide track groove in the body periphery, at least one ball guide passageway longitudinally through the body and parallel with said track, said track and passageway extending from end to end of said body, a substantially narrow projecting part on each of the body end faces in alignment with the track groove and passageway, said part having a curved track profile, a removable cap on each end of the body, each cap having a curved cavity to receive a said projecting part and co-operate with said profile track to form an end guide path for linking the adjacent end of the track groove with the adjacent open end of the guide passageway, a set of ball bearings filling the track groove, end paths and passageway, said body having at least part of its periphery curved to engage a structure member, and securing bolts for passing through the body with clearance into said member, the arrangement being such as to enable the body to be self-aligning about a lineal line into an operative position on said structure member for the balls in the track groove to be located in a track provided in another structure guide member.

2. Bearing unit according to claim 1, wherein the body is cylindrical and has its securing bolts furnished with collars profiled on their inner faces to engage said body.

3. Bearing unit according to claim 1, wherein the body is cylindrical with removable cylindrical end caps, said body having two linear guide track grooves diametrically opposite one another and two oppositely off-set linear guide passageways, each said passageway lying closely adjacent the other track groove, a track profiled integral projecting part at each end of the body joining each track groove to its passageway which lies closely adjacent the other track groove, the pair of equally projecting parts at each end of the body lying parallel one to the other in an inclined position, and two sets of ball bearings to engage spaced opposite guide tracks of a structure.

References Cited in the file of this patent

UNITED STATES PATENTS

| | | |
|---|---|---|
| 1,750,140 | Thompson | Mar. 11, 1930 |
| 2,626,540 | Eserkaln | Jan. 27, 1953 |
| 3,008,774 | Morris et al. | Nov. 14, 1961 |

FOREIGN PATENTS

| | | |
|---|---|---|
| 730,922 | France | May 23, 1932 |